(12) United States Patent
Shiue et al.

(10) Patent No.: US 8,300,159 B2
(45) Date of Patent: Oct. 30, 2012

(54) STRUCTURE OF PICO PROJECTOR

(75) Inventors: Shin-Gwo Shiue, Hu Kou Township, Hsinchu County (TW); David Tsai, Hu Kou Township, Hsinchu County (TW)

(73) Assignee: Cordic Technology Co., Ltd., Hsinchu County (TW)

( * ) Notice: Subject to any disclaimer, the term of this patent is extended or adjusted under 35 U.S.C. 154(b) by 436 days.

(21) Appl. No.: 12/765,847

(22) Filed: Apr. 22, 2010

(65) Prior Publication Data

US 2011/0261274 A1 Oct. 27, 2011

(51) Int. Cl.
*G02F 6/1335* (2006.01)

(52) U.S. Cl. ................................. 349/8; 349/9

(58) Field of Classification Search .................... 349/8, 9
See application file for complete search history.

(56) References Cited

U.S. PATENT DOCUMENTS

| | | | |
|---|---|---|---|
| 7,325,957 B2* | 2/2008 | Morejon et al. | 362/555 |
| 7,458,687 B2* | 12/2008 | Silverstein et al. | 353/20 |
| 2004/0080938 A1* | 4/2004 | Holman et al. | 362/231 |
| 2006/0164726 A1* | 7/2006 | Morejon et al. | 359/495 |
| 2007/0273796 A1* | 11/2007 | Silverstein et al. | 348/752 |
| 2007/0273797 A1* | 11/2007 | Silverstein et al. | 348/752 |
| 2007/0273798 A1* | 11/2007 | Silverstein et al. | 348/752 |
| 2010/0039707 A1* | 2/2010 | Akahane et al. | 359/576 |
| 2010/0201895 A1* | 8/2010 | Golub | 348/759 |

* cited by examiner

*Primary Examiner* — K. Cyrus Kianni
(74) *Attorney, Agent, or Firm* — Leong C. Lei

(57) ABSTRACT

A pico projector includes a light-emitting diode module, collimators, a lens array, magnification lenses, a reflection mirror, a polarizing beam splitter, an LCoS (light crystal on silicon) panel, and an image lens module, wherein the light-emitting diode module emits red, green, and blue lights. The collimators convert light from the light-emitting diode module into collimated light. The lens array homogenizes the collimated light. The magnification lenses magnify the homogenized light from the lens array with a predetermined ratio to be projected onto the LCoS panel. The reflection mirror changes direction of the light path. The polarizing beam splitter allows for transmission of a horizontal polarization light component and reflects a vertical polarization light component. The LCoS panel reflects and modulates the light to form an optic signal. The image lens module includes, in sequence, positive, positive, negative, positive, and positive lenses to project the optical signal to a screen.

5 Claims, 1 Drawing Sheet

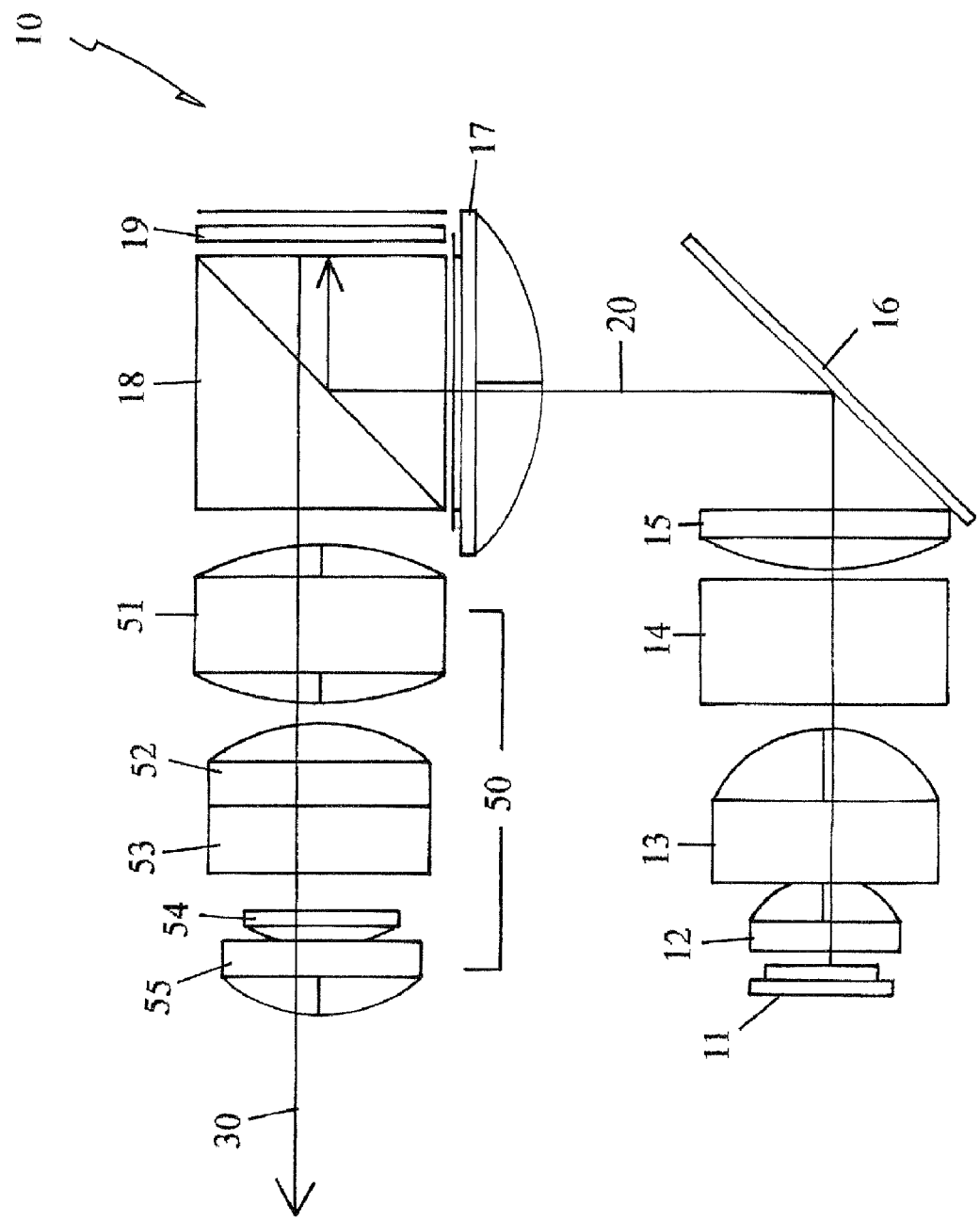

STRUCTURE OF PICO PROJECTOR

TECHNICAL FIELD OF THE INVENTION

The present invention generally relates to a structure of pico projector, and more particularly to an improved structure for application in pico projectors.

DESCRIPTION OF THE PRIOR ART

A conventional projector comprises a light processing system, such as 3-chip LCD (3LCD) of Epson, digital light processing (DLP) of Texas Instrument, and light crystal on silicon (LCoS) of 3M, and the conventional light processing system comprises a white light source of for example high-voltage halogen lamp, xenon lamp, or mercury lamp, which is generally not environment-friendly, to project a white light beam that is subjected to color separation through splitters, panels, or color wheels to produce lights of three primary colors, namely red, green, and blue. The lights of three primary colors are then combined and projected to a screen. Optic devices that are required for such a process are quite bulky and occupy quite an amount of space inside a projector. This is adverse to applications of the projectors to medium devices that are in the trends of personalization, miniaturization, portability, and plug-and-play.

The conventional light processing systems as mentioned above further needs a heat dissipation device to remove the great amount of heat generated by the conventional lighting bulb that serves as the light source of the light processing system and a fan device and comprises a fan device that usually generate noises, and also suffers the inconvenience of frequent replacement of the lighting bulbs for the lighting bulbs used in the conventional light processing systems are generally of a short lifespan. These are also problems that make it is difficult for the projectors to comply with the current trends of technology.

The present invention aims to provide a structure of pico projector, which adopts a light-emitting diode module having three primary colors, namely red, green, and blue, in order to reduce the amount of space required for the light processing system, allow for efficient switching and projection, and eliminate the need of heat dissipation fans that means no noise generated. Further, the life span of lighting bulb can be extended to as long as twenty thousand hours. In addition, the structure of pico projector according to the present invention generates no black matrix when combined with the high open ration realized through LCoS and arranging wiring and switching elements under the reflective layer, whereby the projection shows seaming free images and eliminates screen door effect so that the projected image is clear and bright.

SUMMARY OF THE INVENTION

The present invention provides a structure of pico projector, which is composed of a light-emitting diode module, collimators, a lens array, magnification lenses, a reflection mirror, a polarizing beam splitter, an LCoS (light crystal on silicon) panel, and an image lens module, wherein the light-emitting diode module emits red, green, and blue lights.

The present invention provides a structure of pico projector, which is composed of a light-emitting diode module, collimators, a lens array, magnification lenses, a reflection mirror, a polarizing beam splitter, an LCoS (light crystal on silicon) panel, and an image lens module, wherein the collimators convert light from the light-emitting diode module into collimated light.

The present invention provides a structure of pico projector, which is composed of a light-emitting diode module, collimators, a lens array, magnification lenses, a reflection mirror, a polarizing beam splitter, an LCoS (light crystal on silicon) panel, and an image lens module, wherein the lens array homogenizes the collimated light.

The present invention provides a structure of pico projector, which is composed of a light-emitting diode module, collimators, a lens array, magnification lenses, a reflection mirror, a polarizing beam splitter, an LCoS (light crystal on silicon) panel, and an image lens module, wherein the magnification lenses magnify the homogenized light from the lens array with a predetermined ratio to be projected onto the LCoS panel.

The present invention provides a structure of pico projector, which is composed of a light-emitting diode module, collimators, a lens array, magnification lenses, a reflection mirror, a polarizing beam splitter, an LCoS (light crystal on silicon) panel, and an image lens module, wherein the reflection mirror changes the direction of the light path.

The present invention provides a structure of pico projector, which is composed of a light-emitting diode module, collimators, a lens array, magnification lenses, a reflection mirror, a polarizing beam splitter, an LCoS (light crystal on silicon) panel, and an image lens module, wherein the polarizing beam splitter allows for transmission of a horizontal polarization component of the light and reflects a vertical polarization component of the light.

The present invention provides a structure of pico projector, which is composed of a light-emitting diode module, collimators, a lens array, magnification lenses, a reflection mirror, a polarizing beam splitter, an LCoS (light crystal on silicon) panel, and an image lens module, wherein the LCoS panel reflects and modulates the light to form an optic signal to be projected to a screen.

The present invention provides a structure of pico projector, which is composed of a light-emitting diode module, collimators, a lens array, magnification lenses, a reflection mirror, a polarizing beam splitter, an LCoS (light crystal on silicon) panel, and an image lens module, wherein the image lens module comprises an assembly of lenses including sequentially positive, positive, negative, positive, and positive lenses to project an image from the LCoS panel to the screen.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a schematic view of a structure of pico projector according to the present invention.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIG. 1, which shows a schematic view of a structure of pico projector according to the present invention, the pico projector of the present invention is generally designated at 10, having a light path 20, comprising a light source constituted by a single light-emitting diode (LED) module 11 that is composed of one or more light-emitting diodes to emit red (R), green (G), and blue (B) lights, which travel through two positive lens elements, respectively serving as a front collimator 12 and a rear collimator 13, to convert diverging light from the LED 11 into collimated light beam. The collimated beam travels through a lens array 14 for homogenization of the collimated beam. The lens array 14 comprises lenses that have a focus length of 3-4.5 mm to provide a preferred result. Afterwards, the light beam transmits through a front magnification lens 15 to magnify and direct the light from the lens array 14 to a reflection mirror 16 that shows a reflection angle of 45 degrees, whereby the light path 20 that is originally directed in a horizontal direction is reflected by 90 degree to a vertical direction for applying to a rear magnification lens 17 for second time magnification of a proper magnification ration. It is noted that the front and rear magnification lens 15, 17, which are both positive lens elements, must be of an arrangement that the front magnification lens 15 has a focus length greater than that of the rear magnification lens 17. The light is then guided through a polarizing beam splitter (PBS) 18 to be reflected, in fullness, to an LCoS panel 19, which completes a first phase of light processing of the light path 20.

Referring to FIG. 1, the pico projector 10 according to the present invention comprises a polarizing beam splitter 18 that reflects light component of vertical polarization but allows light component of horizontal polarization to transmit, whereby the LCoS panel 19 reflects and modulates the light projected thereto in a horizontal direction to form an optic signal to be projected to a screen. The optic signal passes through the polarizing beam splitter 18 to form a light path 30 that subsequently transmits through and is thus processed by a lens-based processing mode performed by a projection lens module 50 sequentially comprising a first positive lens 51, a second positive lens 52, a first negative lens 53, a third positive 54, and a fourth positive lens 55 that are lined up along the light path 30 so as to allow an image formed by the LCoS panel 9 to be projected onto a projection screen.

The LCoS panel 19 serves as an image source and the polarizing beam splitter 18 modifies the polarization of light and is not related to the formation of image. The projection lens module 50 functions to project and focus the image formed by the LCoS panel 19 onto the screen.

The pico projector according to the present invention allows for the formation of a palm-top device, which can be supplied with electrical power and image signals generated by for example a personal computer through USB (Universal Serial Bus) connection. Or alternatively, the structure of pico projector according to the present invention can be embedded in a medium device, such as a mobile phone, a digital camera, or a notebook computer to provide various applications.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A pico projector, comprising a light-emitting diode module, collimators, a lens array, magnification lenses, a reflection mirror, a polarizing beam splitter, an LCoS panel, and an image lens module, characterized in that:

the light-emitting diode module emits red, green, and blue lights;

the collimators convert light from the light-emitting diode module into collimated light;

the lens array homogenizes the collimated light;

the magnification lenses magnify the homogenized light from the lens array with a predetermined ratio to be projected onto the LCoS panel;

the reflection mirror changes direction of the light path;

the polarizing beam splitter allows for transmission of a horizontal polarization component of the light and reflects a vertical polarization component of the light;

the LCoS panel reflects and modulates the light to form an optic signal to be projected to a screen; and the image lens module comprises an assembly of lenses including sequentially positive, positive, negative, positive, and positive lenses to project an image from the LCoS panel to the screen.

2. The pico projector according to claim 1, wherein the light-emitting diode module that serves as a light source comprises at least one light-emitting diode selectively comprising red, green, and blue lights so as to combine light paths of the three color lights into a signal light path.

3. The pico projector according to claim 1, wherein the light magnification lens arranged between the lens array and the polarizing beam splitter comprise two positive lenses, which magnify the light from the lens array by the predetermined ratio and guide the light to the LCoS panel, the two positive lens comprising a front lens that has a focus length greater than a focus length of a rear lens of the two lenses.

4. The pico projector according to claim 1, wherein the lens array comprises lenses each having a focus length within the range of 3-4.5 mm.

5. The pico projector according to claim 1, wherein the reflection mirror that changes the direction of the light path simplifies light processing system.

* * * * *